(12) United States Patent
Zhou et al.

(10) Patent No.: US 8,196,264 B2
(45) Date of Patent: Jun. 12, 2012

(54) HINGE ASSEMBLY FOR PORTABLE ELECTRONIC DEVICES

(75) Inventors: Xin-Quan Zhou, Shenzhen (CN); Hsiao-Hua Tu, Taipei (TW); Ye Liu, Shenzhen (CN); Yan-Ling Gao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 271 days.

(21) Appl. No.: 12/557,704

(22) Filed: Sep. 11, 2009

(65) Prior Publication Data

US 2010/0156254 A1 Jun. 24, 2010

(30) Foreign Application Priority Data

Dec. 18, 2008 (CN) .......................... 2008 1 0306363

(51) Int. Cl.
*E05D 3/10* (2006.01)

(52) U.S. Cl. ................ 16/367; 16/324; 16/321

(58) Field of Classification Search ................ 16/367, 16/224, 348, 344, 324, 321, 319, 228, 368, 16/334; 379/433.12, 433.13
See application file for complete search history.

(56) References Cited

U.S. PATENT DOCUMENTS

| 3,644,023 | A * | 2/1972 | Villani | 351/113 |
|---|---|---|---|---|
| 6,993,808 | B1 * | 2/2006 | Bennett et al. | 16/334 |
| 7,640,629 | B2 * | 1/2010 | Kim | 16/367 |
| 2004/0006848 | A1 * | 1/2004 | Hsu | 16/367 |
| 2008/0115326 | A1 * | 5/2008 | Kim | 16/367 |
| 2011/0030171 | A1 * | 2/2011 | Hooton et al. | 16/367 |

FOREIGN PATENT DOCUMENTS

CN 2156331 Y 2/1994

* cited by examiner

*Primary Examiner* — Victor Batson
*Assistant Examiner* — Matthew Sullivan
(74) *Attorney, Agent, or Firm* — Altis Law Group, Inc.

(57) ABSTRACT

A hinge assembly includes a positioning module, a connecting module and a rotating module. The positioning module includes a sleeve. The connecting module includes a pivot tube and a shaft. The pivot tube is rotatably attached to the sleeve. The shaft is slidably and rotatably received in the pivot tube. The rotating module is rotatably attached to one end of the shaft.

12 Claims, 8 Drawing Sheets

HINGE ASSEMBLY FOR PORTABLE ELECTRONIC DEVICES

BACKGROUND

1. Technical Field

The present disclosure relates to hinge assemblies, particularly, to a hinge assembly for portable electronic devices such as portable telephones, portable computers, and etc.

2. Description of Related Art

Potable electronic devices such as mobile phones, personal digital assistants, etc., may be classified into various categories according to their appearance. Rotation-type portable electronic devices have become more and more popular. A rotation-type portable electronic usually includes a cover and a main body. The cover and the main body are rotatably connected by a hinge assembly. However, since the mobile phone can only be opened to preset angles, the display cannot realize angle adjustment relative to the phone body. This kind of mobile phone cannot satisfy the requirement of consumers.

Therefore, there is room for improvement within the art.

BRIEF DESCRIPTION OF THE DRAWINGS

Many aspects of the hinge assembly can be better understood with reference to the following drawings. The components in the drawings are not necessarily drawn to scale, the emphasis instead being placed upon clearly illustrating the principles of the hinge assembly. Moreover, in the drawings, like reference numerals designate corresponding parts throughout the several views, in which.

DETAILED DESCRIPTION OF THE EMBODIMENTS

Figure 1:
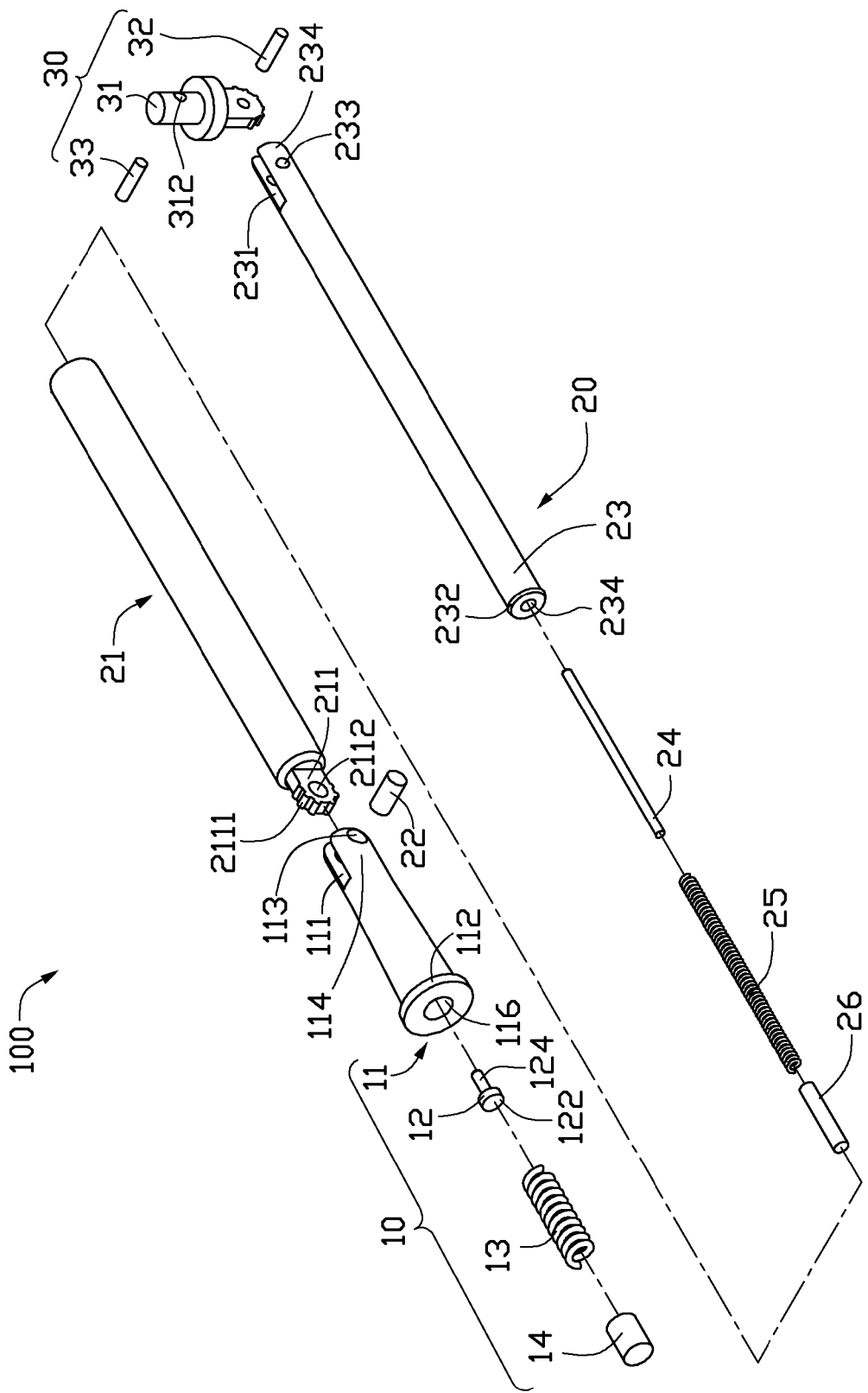
FIG. 1 is an exploded, schematic view of a hinge assembly, in accordance with an exemplary embodiment.
Figure 2:
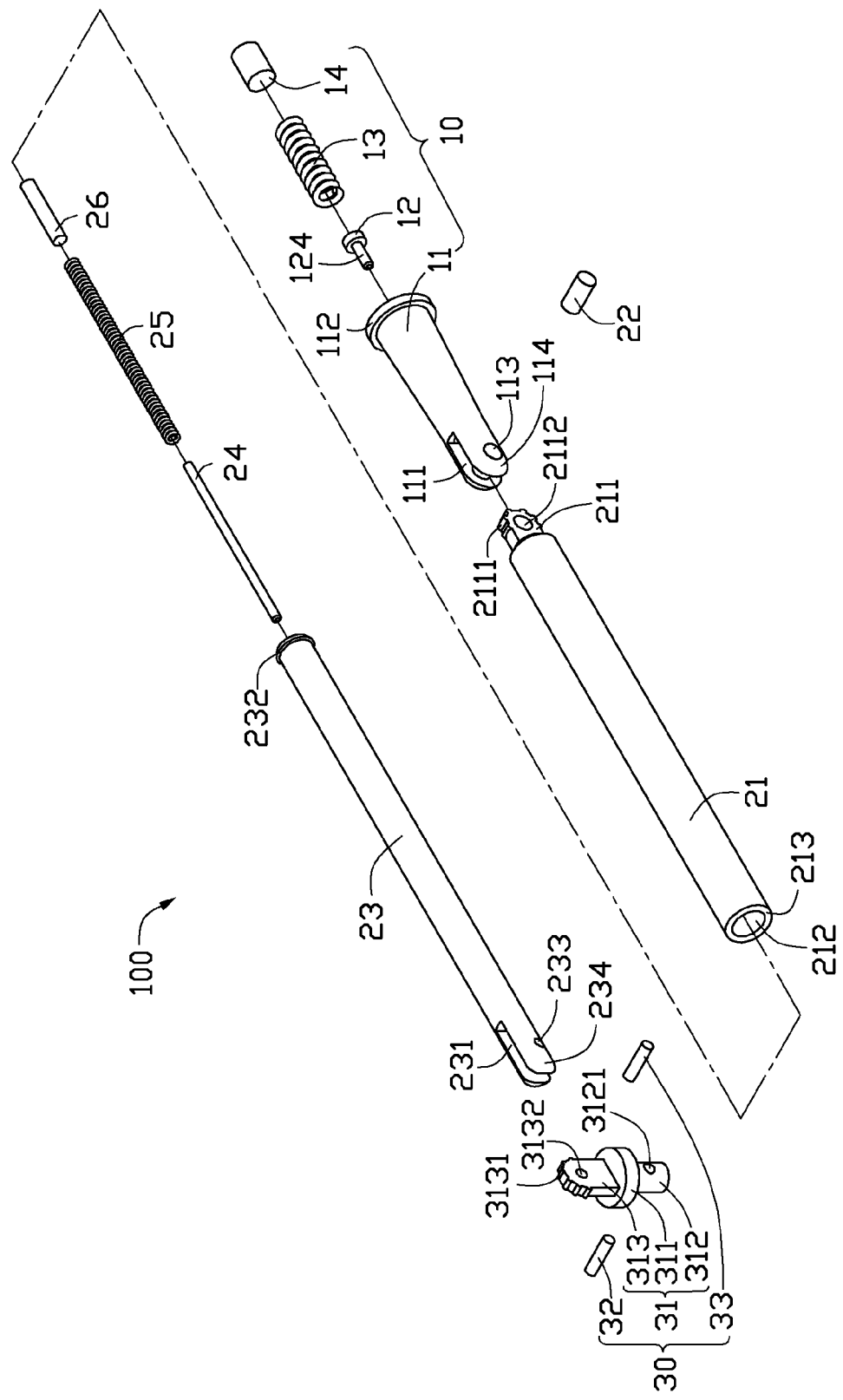
FIG. 2 is similar to FIG. 1, but showing from another aspect.

Referring to FIGS. 1-2, a hinge assembly 100 is applied to a portable electronic device 500 (shown in FIG. 8), in accordance with an exemplary embodiment. The hinge assembly 100 includes a positioning module 10, a connecting module 20 and a rotating module 30. The connecting module 20 rotatably connects the positioning module 10 and the rotating module 30.

The positioning module 10 includes a sleeve 11, a resisting member 12, a first spring 13 and a first stopper 14. The sleeve 11 defines a receiving hole 116 along an axial direction thereof. The resisting member 12, the first spring 13 and the first stopper 14 are received in the receiving hole 116 of the sleeve 11. A locking flange 112 is formed at one end of the sleeve 11. The other end of the sleeve 11 longitudinally defines a cutout 111 so as to form two arms 114. Each arm 114 transversely defines a pin hole 113. The two pin holes 113 of the arms 114 are aligned with each other. The resisting member 12 includes a head 122 and a rod 124 longitudinally extending from the head 122.

The connecting module 20 includes a pivot tube 21, a shaft 23, a pole 24, a second spring 25 and a second stopper 26. The pivot tube 21 defines a central hole 212 for receiving the shaft 23. An extending portion 211 extends from one end of the pivot tube 21, and a locking portion 213 is formed at the other end of the pivot tube 21. The extending portion 211 is receivable between the two arms 114 of the sleeve 11. A plurality of latching teeth 2111 are formed at an outer arcuate surface (not labeled) of the extending portion 211. The extending portion 211 transversely defines a latching hole 2112 corresponding to the pin holes 113 of the sleeve 11. A latching pin 22 is engagable in the pin holes 113 and the latching hole 2112 so as to connect the sleeve 11 and the pivot tube 21. The rod 124 of the resisting member 12 is configured for engaging with the latching teeth 2111 of the extending portion 211 so as to stop the pivot tube 21 from further rotating relative to the latching pin 22. The locking portion 213 radially extends from an inner circumferential surface so as to reduce a diameter of the central hole 212.

The shaft 23 is receivable in the central hole 212 of the pivot tube 21, and defines an axis hole 234 for receiving the pole 24, the second spring 25 and the second stopper 26. A ring rib 232 is formed at one end of the shaft 23. A diameter of the ring rib 232 is larger than an inner diameter of the locking portion 213 of the pivot tube 21, so that the locking portion 213 can stop the shaft 23 disengaging from the pivot tube 21. The other end of the shaft 23 has a slot 231 so as to form two prongs 234. Each prong 234 transversely defines a connecting hole 233. The connecting holes 233 of the prongs 231 are axially aligned with each other.

The rotating module 30 includes a rotating member 31, a connecting pin 32 and a locking pin 33. The rotating member 31 includes a platform 311, a latching column 312 and an engaging portion 313. The latching column 312 and the engaging portion 313 respectively extend from two sides of the platform 311. The latching column 312 defines a through hole 3121 for allowing the locking pin 33 to extend therethrough. A plurality of engaging teeth 3131 are formed at an arcuate edge (not labeled) of the engaging portion 313 away from the platform 311. The engaging portion 313 defines a round hole 3132 corresponding to the connecting holes 233 of the shaft 23. The connecting pin 32 is engagable in the connecting holes 233 and the round hole 3132 of the rotating member 31 so as to connect the rotating member 31 and the shaft 23. The pole 24 is configured for engaging with the engaging teeth 3131 so as to stop the rotating member 31 from further rotating relative to the connecting pin 32.

Figure 3:
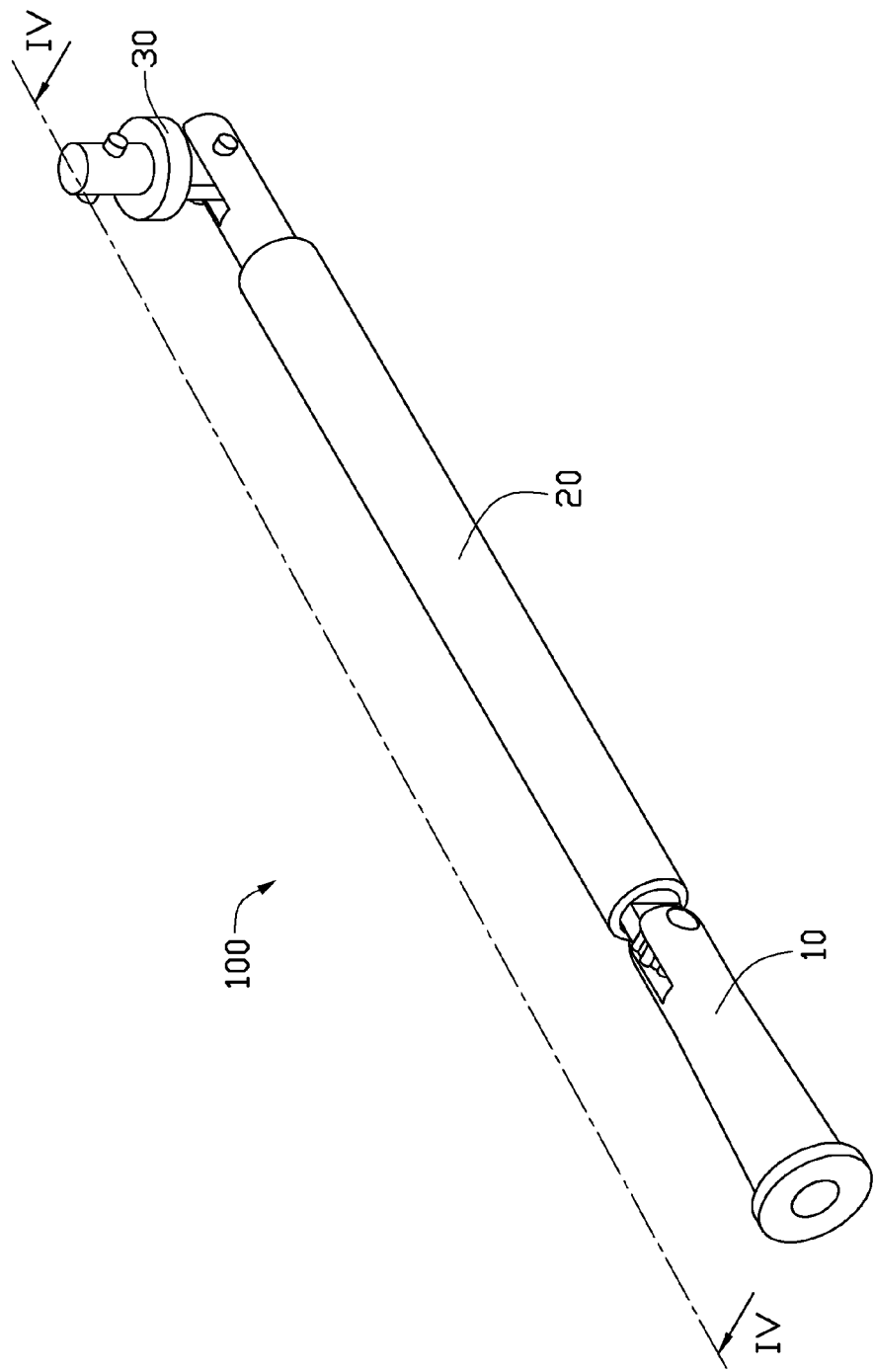
FIG. 3 is an assemble, schematic view of the hinge assembly showing in FIG. 1.
Figure 4:
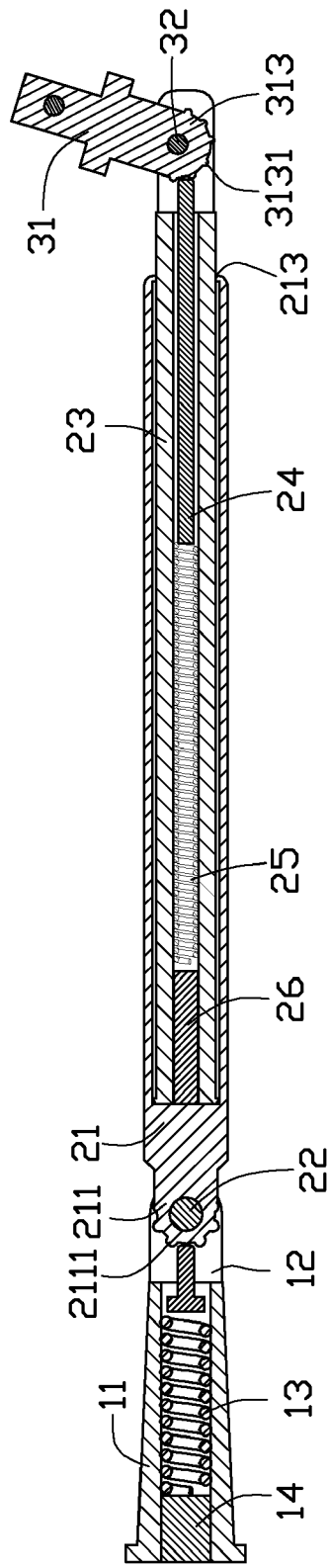
FIG. 4 is a cross-sectional view taken along line IV-IV of FIG. 3.

In assembly of the hinge assembly 100, also referring to FIGS. 3-4, the first stopper 14, the first spring 13 and the resisting member 12 are received in the receiving hole 116 of the sleeve 11, wherein the first spring 13 is positioned between the first stopper 14 and the resisting member 12. The pole 24, the second spring 25 and the second stopper 26 are inserted into the axis hole 234 of the shaft 23. The rotating member 31 is attached to the shaft 23 by the connecting pin 32, so that the rotating member 31 can rotate relative to the connecting pin 32. The engaging portion 313 of the rotating member 31 pushes the pole 24 to compress the second spring 25. The compressed second spring 25 provides a force on the pole 24, so that the pole 24 can always resist the engaging portion 313. The shaft 23 is then rotatably received in the central hole 212 of the pivot tube 21. At last, the pivot tube 21 is attached to the sleeve 11 by the latching pin 22, so that the pivot tube 21 is rotatable relative to the latching pin 22. The extending portion 211 of pivot tube 21 pushes the resisting member 12 to compress the first spring 13. The compressed first spring 13 provides a force on the resisting member 12, so that the rod 124 of the resisting member 12 can always resists the latching teeth 2111.

Figure 5:
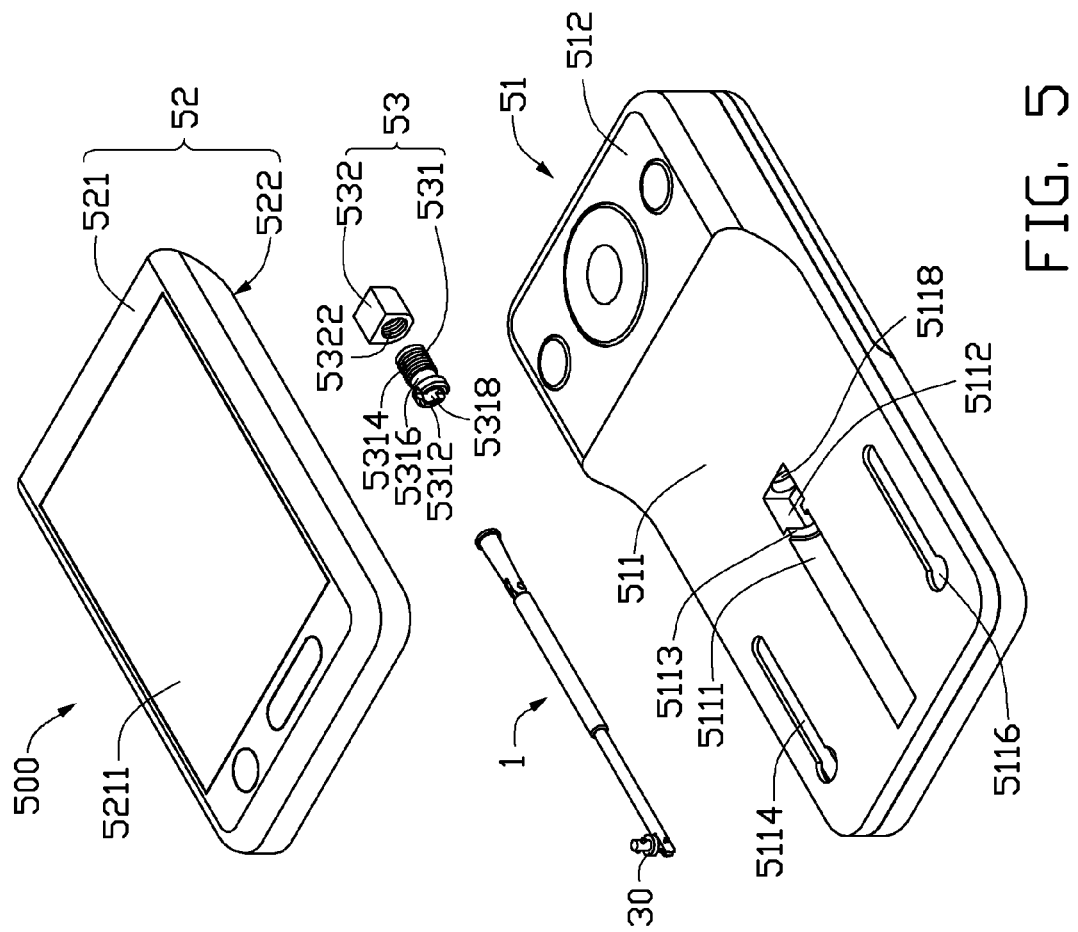
FIG. 5 is an exploded, schematic view of a portable electronic device having the hinge assembly shown in FIG. 1 therein, including a cover and a main body.
Figure 6:
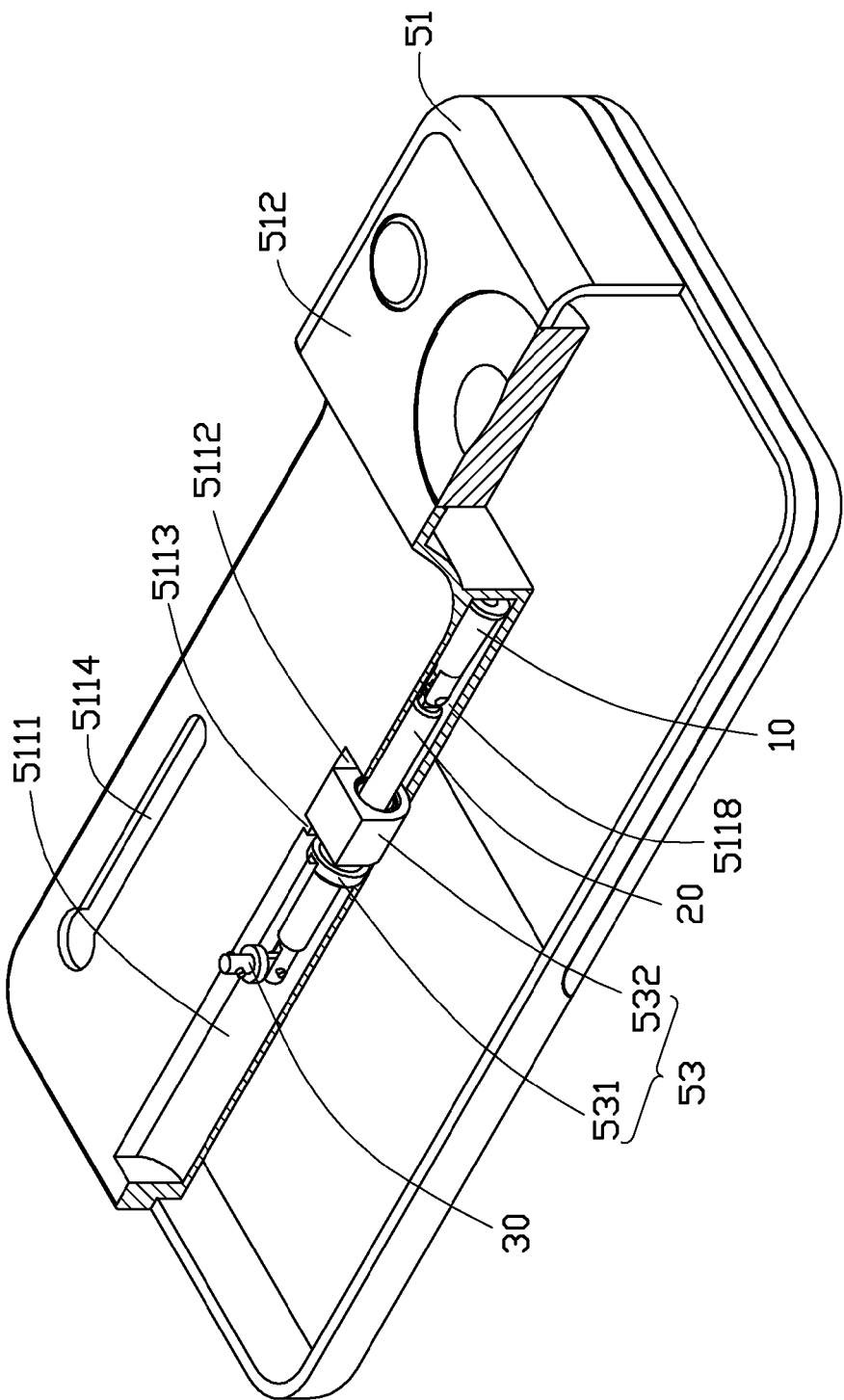
FIG. 6 is a partially cross-sectional view of the main body, showing the hinge assembly attached to the main body.
Figure 7:
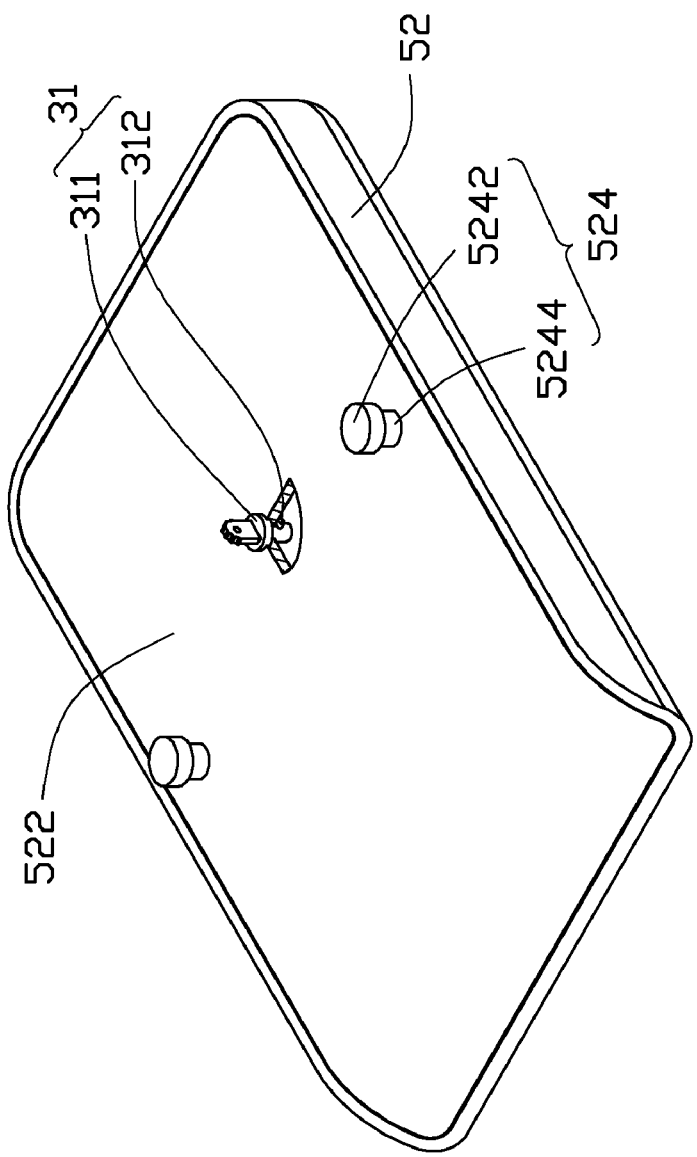
FIG. 7 is a partially cross-sectional view of the cover shown in FIG. 5, showing a rotating module of the hinge assembly attached to the cover.

Referring to FIGS. 5-7, the portable electronic device 500 with the hinge assembly 100 therein further includes a main body 51, a cover 52 and a latching module 53. The main body 51 includes a matching surface 511 and a key portion 512 adjacent to the matching surface 511. A latching groove 5112 is defined at a middle area of the matching surface 511. A receiving groove 5111 and a cavity 5118 are defined at two opposite ends of the latching groove 5112, and respectively communicate with the latching groove 5112. The cavity 5118 is positioned beneath the matching surface 511 and extends toward the key portion 512. The cavity 5118 is configured for allowing the hinge assembly 100 to slide therein. An arcuate flange 5113 is positioned between the receiving groove 5111 and the latching groove 5112. Two sliding slots 5114 are positioned at two opposite sides of the receiving groove 5111, respectively. An inserting hole 5116 is defined at one end of each sliding slot 5114. A diameter of each inserting hole 5116 is larger than a width of the sliding slot 5114.

The cover 52 has a top portion 521 and a bottom portion 522. A display 5211 is arranged on the top portion 521. The size of the bottom portion 522 matches the matching surface 511 of the main body 51. Two sliding members 524 are positioned at two opposite sides of the bottom portion 522 corresponding to the two inserting holes 5116. Each sliding member 524 includes a head portion 5242 and a rod portion 5244. The head portion 5242 is receivable in the inserting hole 5116, and the rod portion 5244 is slidable in the sliding slot 5114. A diameter of the head portion 5242 is larger than a width of the sliding slot 5114, so that the head portion 5242 can stop the cover 52 disengaging from the main body 51 when the sliding members 524 slide along the sliding slots 5114. The bottom portion 522 also defines a locking hole 5222 (shown in FIG. 8) between the two sliding members 524, for latching with the latching column 312 of the rotating member 31.

The latching module 53 includes a seat 532 and a fixing member 531. The seat 532 defines a screw hole 5322. The size of the seat 532 is fit to be fixed in the latching groove 5112. The fixing member 531 includes a latching portion 5312, a screw portion 5314 and a connecting portion 5316 connecting the latching portion 5312 and the screw portion 5314. The fixing member 531 defines a sliding hole 5318 allowing the hinge assembly 100 to extend therethrough. The latching portion 5312 partially radialy extends into the sliding hole 5318 so as to stop the locking flange 112 of the sleeve 11 disengaging from the fixing member 531 when the hinge assembly 100 is inserted into the fixing member 531. The latching portion 5312 is elastic and divided into two separate parts. Thus, the locking flange 112 can be inserted into the sliding hole 5312 via the latching portion 5312.

Figure 8:
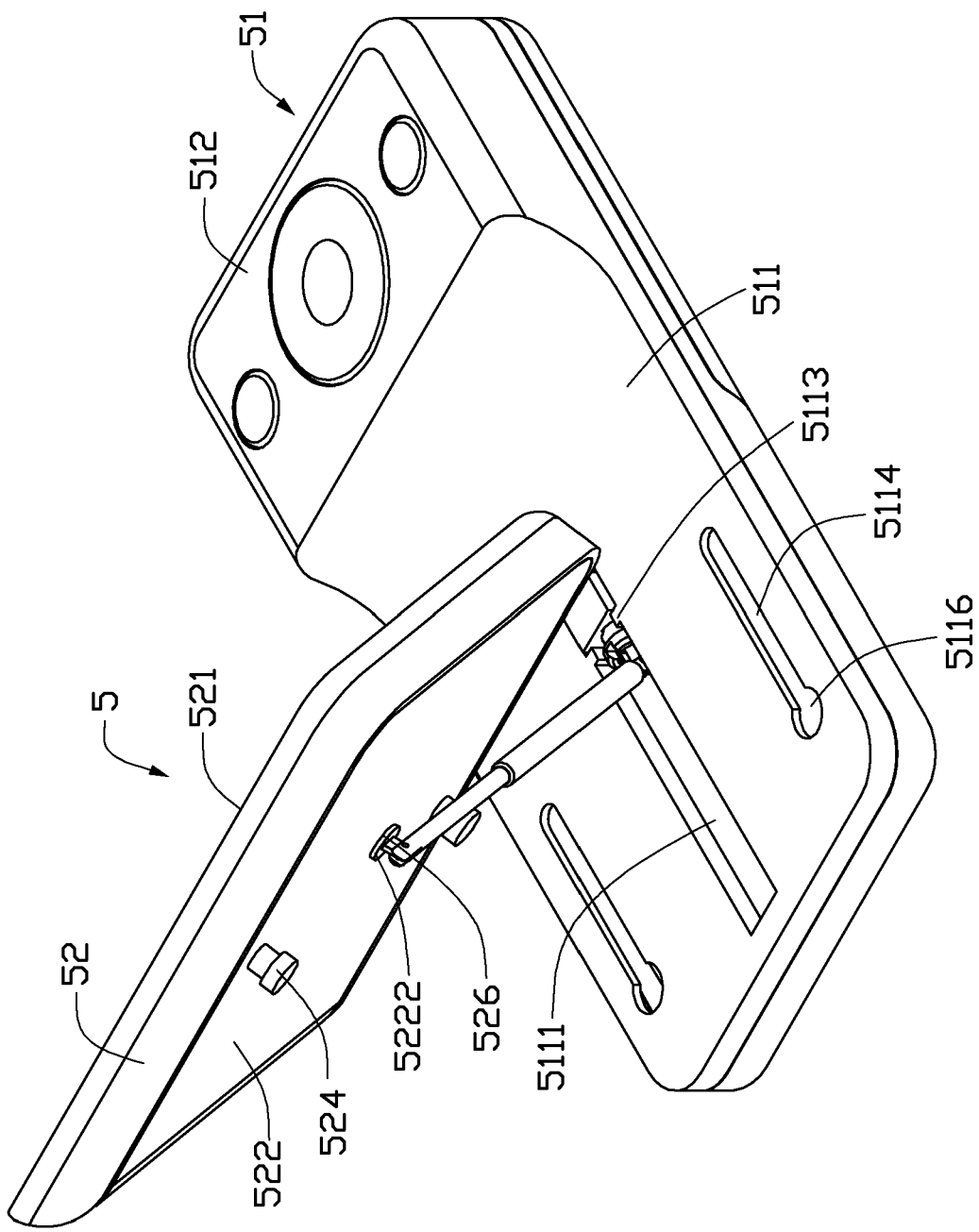
FIG. 8 is an assembled, schematic view of the portable electronic device shown in FIG. 5.

In assembly of the hinge assembly 100 to the portable electronic device 500, also referring to FIG. 8, the fixing member 531 engages in the seat 532. The seat 532 is then fixed in the latching groove 5112 of the main body 51. The latching portion 5312 of the fixing member 531 and the seat 532 resist two opposite sides of the arcuate flange 5113, respectively, and the connecting portion 5316 is supported by the arcuate flange 5113. The sleeve 11 of the hinge assembly 100 passes the fixing member 531 and is inserted into the cavity 5118. At last, the locking pin 33 is engaged in the through hole 3121 after the latching column 312 being inserted into the locking hole 5222. Thus, the hinge assembly 100 connects the cover 52 and the main body 51, and the cover 52 can rotate relative to the main body 51 via the hinge assembly 100.

In use, also referring to FIG. 8, the latching pin 22 is pushed out from the fixing member 531. The pivot tube 21 is rotated upward relative to the latching pin 22. Since the rod 124 of the resisting member 12 stops the pivot tube 21 from further rotating, the pivot tube 21 can remain still without outside force. In addition, the shaft 23 may partially extend out from the pivot tube 21. Thus, the cover 52 may be rotated to raised up at different positions. Since the shaft 23 is rotatable relative to the pivot tube 21, the cover 52 may rotate relative to the pivot tube 21. In addition, the cover 52 is rotatable relative to the connecting pin 32, and can remain still by engagement of the pole 24 and the engaging teeth 3131.

When the cover 52 is closed, the shaft 23 is inserted into the pivot tube 21, and the pivot tube 21 is rotated in line with the sleeve 11. The head portions 5242 of the sliding members 524 respectively pass the inserting holes 5116. The sleeve 11 and partial of the pivot tube 21 are pushed into the cavity 5118, while the sliding members 524 respectively slide along the sliding slots 5114.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad wide-ranging meaning of the terms in which the appended claims are expressed.

What is claimed is:

1. A portable electronic device comprising:
   a cover;
   a main body having a matching surface, the main body defining a receiving groove, a latching groove and a cavity, the receiving groove and the latching groove extending through the matching surface, the cavity being beneath within the main body, the receiving groove and the cavity defined at opposite ends of the latching groove, the receiving groove, the latching groove and the cavity in communication with each other and longitudinally coaxial;
   a latching module fixed in the latching groove, the latching module including a fixing member, the fixing module defining a sliding hole longitudinally coaxial with the cavity; and
   a hinge assembly including:
      a positioning module;
      a connecting module rotatably connected to the positioning module, the connecting module and the positioning module extending through the sliding hole of the fixing member and the cavity of the main body and allowing the connecting module to slide out from the sliding hole and keep the positioning module in the fixing member; and
      a rotating module being received in the receiving groove, one end of the rotating module being rotatably attached to the connecting module, and another end being rotatably attached to the cover.

2. The portable electronic device as claimed in claim 1, wherein the latching module further comprises a seat fixed in the latching groove, the seat defines a screw hole, the fixing member includes a screw portion, and the screw potion of the fixing member is engaged in the screw hole of the seat so as to attach the fixing member to the seat.

3. The portable electronic device as claimed in claim 2, wherein the fixing member further comprises a latching portion, the positioning module including a sleeve, the sleeve comprises a locking flange at one end thereof, and the latching portion of the fixing member stops the locking flange so as to prevent the hinge assembly from separating from the main body.

4. The portable electronic device as claimed in claim 3, wherein an arcuate flange is positioned between the receiving groove and the latching groove, and the latching portion of the fixing member and the seat respectively resist two sides of the arcuate flange.

5. The portable electronic device as claimed in claim 1, wherein the rotating module further comprises a locking pin and a rotating member, the rotating member further includes a latching column, the latching column defines a through hole, the cover defines a locking hole, the latching column is inserted in the locking hole and is locked by inserting the locking pin into the through hole.

6. The portable electronic device as claimed in claim 1, wherein the positioning module includes a shaft, the connecting module includes a pivot tube and a shaft, the shaft is slidably and rotatably received in the pivot tube, a latching pin connects the sleeve and the pivot tube, the latching pin is perpendicular to an axis line of the sleeve, and the pivot tube is rotatable relative to the latching pin.

7. The portable electronic device as claimed in claim 6, wherein a connecting pin connects the shaft and the rotating member, the connecting pin is perpendicular to an shaft, and the rotating member is rotatable relative to the latching pin.

8. The portable electronic device as claimed in claim 7, wherein the positioning module further comprises a first stopper, a first spring and a resisting member, the first spring and the resisting member are received in the sleeve, the first stopper blocking one end of the sleeve, the first spring abuts against the first stopper, the pivot tube has an extending portion at one end thereof, the extending portion has a plurality of latching teeth, and the first spring forces the resisting member to always engage with the latching teeth.

9. The portable electronic device as claimed in claim 3, wherein the connecting module includes a pivot tube and a shaft, the rotating module includes a rotating member and a connecting pin, the connecting pin connects the shaft and the rotating member, the connecting pin is perpendicular to the shaft, and the rotating member is rotatable relative to the connecting pin.

10. The portable electronic device as claimed in claim 9, wherein the connecting module further comprises a second stopper, a second spring and a pole, the second spring and the pole are received in the shaft, the second stopper blocks one end of the shaft, the second spring abuts against the second stopper, the rotating member comprises an engaging portion, the engaging portion has a plurality of engaging teeth, and the second spring forces the pole to always engage with the engaging teeth.

11. The portable electronic device as claimed in claim 9, wherein the pivot tube has a locking portion form at one end thereof, the shaft has a ring rib at one end thereof, and the locking portion of the pivot tube stops the ring rib of the shaft so as to prevent the shaft from separating from the pivot tube.

12. A portable electronic device comprising:
a cover;
a main body defining a receiving groove, a latching groove and a cavity, the receiving groove and the cavity defined at opposite ends of the latching groove, the receiving groove, the latching groove and the cavity in communication with each other and longitudinally coaxial;
a latching module fixed in the latching groove and defining a hole longitudinally coaxial with the cavity; and
a hinge assembly including a positioning module, a connecting module and a rotating module, one end of the connecting module rotatably connected to the positioning module, another end of the connecting module rotatably connected to the rotating module; the rotating module being received in the receiving groove, the connecting module and the positioning module extending through the latching module and the cavity when in a first state;
wherein the connecting module and the rotating module are pulled out from the cavity when in a second state, the latching module prevents the positioning module from separating from the main body, the connecting module is rotated relative to the positioning module or the rotating module is rotated relative to the connecting module configured for holding the cover relative to the main body in any angle.

* * * * *